(12) United States Patent
Shao et al.

(10) Patent No.: US 11,985,271 B2
(45) Date of Patent: May 14, 2024

(54) METHODS, INTERNET OF THINGS SYSTEMS, AND MEDIA FOR SEAT MANAGEMENT OF SMART GAS CALL CENTER

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN); Bin Liu, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/321,767

(22) Filed: May 22, 2023

(65) Prior Publication Data
US 2023/0291838 A1    Sep. 14, 2023

(30) Foreign Application Priority Data
Apr. 21, 2023    (CN) .......................... 202310432156.6

(51) Int. Cl.
*H04M 3/00*        (2006.01)
*G06Q 10/0631*     (2023.01)
(Continued)

(52) U.S. Cl.
CPC .... *H04M 3/5232* (2013.01); *G06Q 10/06311* (2013.01); *G06Q 30/015* (2023.01);
(Continued)

(58) Field of Classification Search
CPC ............ H04M 3/5232; H04M 3/5183; H04M 3/5238; G06Q 30/015; G06Q 10/06311; G06Q 50/06
(Continued)

(56) References Cited

U.S. PATENT DOCUMENTS

2006/0025173 A1* 2/2006 Kamdar .............. H04M 3/5166
                                                          455/556.1
2014/0067401 A1* 3/2014 Sanjeeva ............. G06F 16/3344
                                                          707/769
(Continued)

FOREIGN PATENT DOCUMENTS

CN    107578813 A    1/2018
CN    108776898 A    11/2018
(Continued)

OTHER PUBLICATIONS

Qian, Min, Search and Implementation of Daqing Gas Customer Service System, Chinese Master's Theses Full-text Database, 2011, 70 pages.
(Continued)

*Primary Examiner* — William J Deane, Jr.
(74) *Attorney, Agent, or Firm* — METIS IP LLC

(57) ABSTRACT

The present disclosure provides a method, an Internet of Things system, and a medium for seat management of a smart gas call center. The method includes: obtaining gas usage data, the gas usage data including at least a historical gas usage rate; generating, based on the gas usage data, a predicted call feature of a smart gas call center within a target time period; generating, based on the predicted call feature, a preferred seat feature of the smart gas call center within the target time period; and transmitting the preferred seat feature to a terminal of the smart gas call center.

4 Claims, 7 Drawing Sheets

(51) Int. Cl.
- *G06Q 30/015* (2023.01)
- *G06Q 50/06* (2012.01)
- *H04M 3/51* (2006.01)
- *H04M 3/523* (2006.01)

(52) U.S. Cl.
CPC .......... *G06Q 50/06* (2013.01); *H04M 3/5183* (2013.01); *H04M 3/5238* (2013.01)

(58) Field of Classification Search
USPC .......... 379/265.02, 265.01, 265.09; 705/346, 705/305, 7.25; 709/224; 700/282
See application file for complete search history.

(56) References Cited

U.S. PATENT DOCUMENTS

| | | |
|---|---|---|
| 2020/0064783 A1* | 2/2020 | Tran .................. F24F 11/72 |
| 2020/0137231 A1 | 4/2020 | Revanur et al. |
| 2020/0382634 A1 | 12/2020 | Mao et al. |
| 2023/0153827 A1 | 5/2023 | Shao et al. |
| 2023/0216959 A1* | 7/2023 | Bohannon ............ G06Q 10/103 379/265.02 |
| 2023/0252877 A1 | 8/2023 | Shao et al. |
| 2023/0254409 A1 | 8/2023 | Shao et al. |

FOREIGN PATENT DOCUMENTS

| | | |
|---|---|---|
| CN | 109146264 A | 1/2019 |
| CN | 110248031 A | 9/2019 |
| CN | 110322205 A | 10/2019 |
| CN | 110392168 A | 10/2019 |
| CN | 111131639 A | 5/2020 |
| CN | 112241924 A | 1/2021 |
| CN | 113724847 A | 11/2021 |
| CN | 113992803 A | 1/2022 |
| CN | 114173010 A | 3/2022 |
| CN | 115631064 A | 1/2023 |
| CN | 115914468 A | 4/2023 |
| CN | 115936449 A | 4/2023 |
| JP | 2020197919 A | 12/2020 |

OTHER PUBLICATIONS

Shao, Zehua, Development Direction of Sensor Network Communication Technology for IOT Intelligent Gas Meter, Gas&Heat, 41(4): B31-B46, 2021.

Jiang, Yiyun et al., Architecture and Functional Platforms of Gas Cloud Customer Service System, Gas&Heat, 41 (11): B32-B35, 2021.

First Office Action in Chinese Application No. 202310432156.6 dated Jun. 2, 2023, 12 pages.

Notification to Grant Patent Right for Invention in Chinese Application No. 202310432156.6 dated Jun. 25, 2023, 5 pages.

* cited by examiner

METHODS, INTERNET OF THINGS SYSTEMS, AND MEDIA FOR SEAT MANAGEMENT OF SMART GAS CALL CENTER

CROSS-REFERENCE TO RELATED APPLICATIONS

This application claims priority of Chinese Patent Application No. 202310432156.6, filed on Apr. 21, 2023, the contents of which are hereby incorporated by reference to its entirety.

TECHNICAL FIELD

The present disclosure relates to the field of seat management, and in particular to a method, an Internet of Things system, and a medium for seat management of a smart gas call center.

BACKGROUND

In gas usage, gas users may make gas inquiries, complaints, and repair reports through a smart gas call center. There are peak and low peak time periods for gas usage, and a volume and frequency of calls to the smart gas call center may increase during peak time periods, and the smart gas call center may face a greater call-in pressure.

Therefore, there is a need for a method, an Internet of Things system, and a medium for seat management of a smart gas call center that can reasonably schedule seats in the smart gas call center based on gas usage data to improve user satisfaction.

SUMMARY

One or more embodiments of the present disclosure provide a method for seat management of a smart gas call center. The method is performed by a processor of a smart gas management platform in an Internet of Things system for seat management of a smart gas call center. The method includes: obtaining gas usage data, the gas usage data including at least a historical gas usage rate; generating, based on the gas usage data, a predicted call feature of a smart gas call center within a target time period; generating, based on the predicted call feature, a preferred seat feature of the smart gas call center within the target time period, the preferred seat feature including a count of customer services in each of one or more time periods within the target time period; and transmitting the preferred seat feature to a terminal of the smart gas call center.

One embodiment of the present disclosure provides an Internet of Things system for seat management of a smart gas call center. The Internet of Things system includes a smart gas user platform, a smart gas service platform, a smart gas management platform, a smart gas sensing network platform, and a smart gas object platform. The smart gas management platform is used to: obtain gas usage data, the gas usage data including at least a historical gas usage rate; generate, based on the gas usage data, a predicted call feature of a smart gas call center within a target time period; generate, based on the predicted call feature, a preferred seat feature of the smart gas call center within the target time period, the preferred seat feature including a count of customer services in each of one or more time periods within the target time period; and transmit the preferred seat feature to a terminal of the smart gas call center.

One or more embodiments of the present disclosure provide a non-transitory computer-readable storage medium, storing computer instructions, wherein when reading the computer instructions in the storage medium, a computer executes a method for seat management of a smart gas call center.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
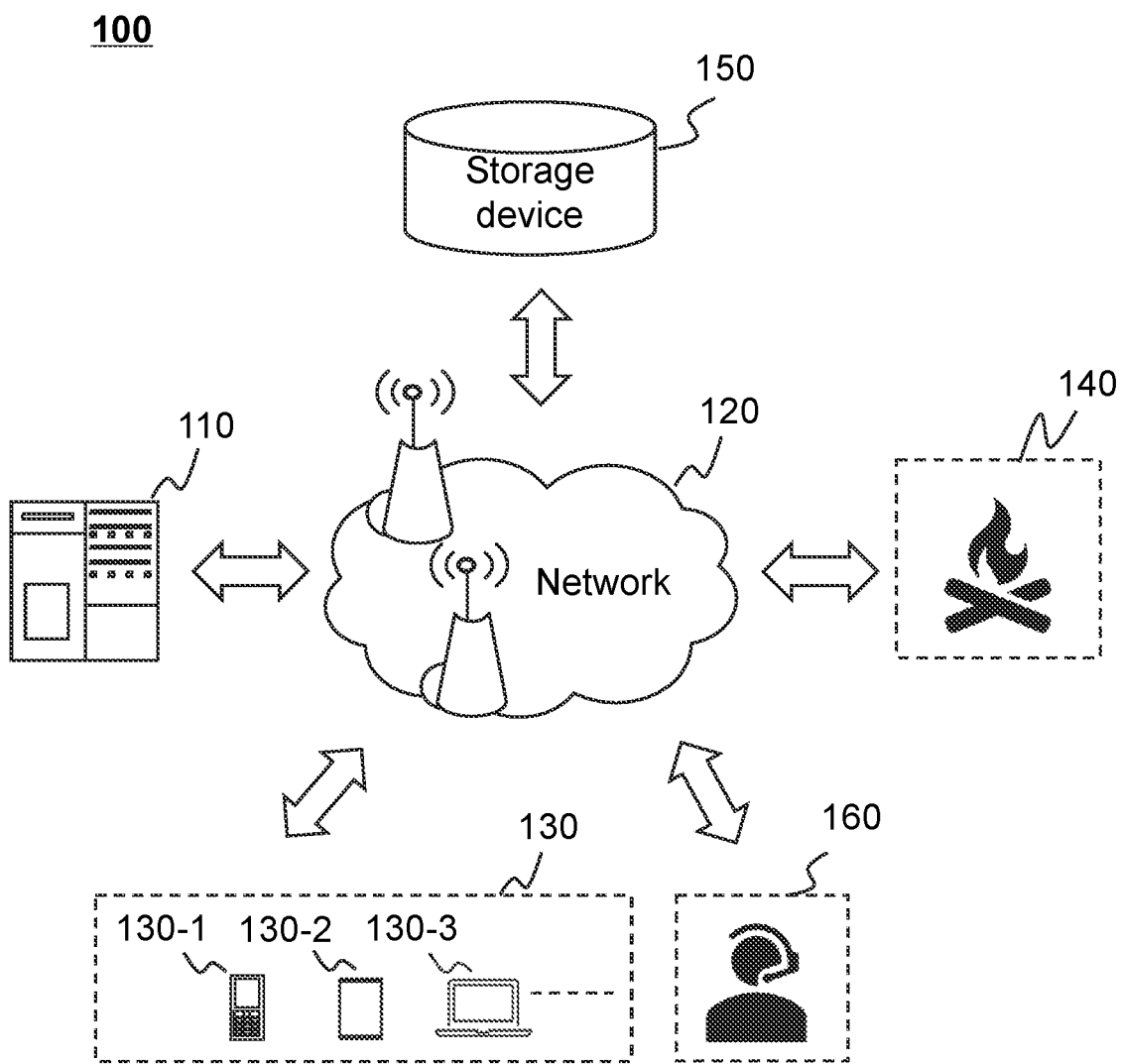
FIG. 1 is a schematic diagram illustrating an application scenario of an Internet of Things system for seat management of a smart gas call center according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating an application scenario of an Internet of Things system for seat management of a smart gas call center according to some embodiments of the present disclosure.

As shown in FIG. 1, an application scenario 100 may include a server 110, a network 120, a terminal device 130, a gas device 140, a storage device 150, and a smart gas call center terminal 160.

In some embodiments, the application scenario 100 may determine a preferred seat feature of the smart gas call center by implementing the method and/or the Internet of Things system for the seat management of the smart gas call center disclosed in the present disclosure. For example, in a typical application scenario, the Internet of Things system for the seat management of the smart gas call center may obtain gas usage data through a third-party platform or through the gas device 140. The server 110 (a processing device) generates, based on the gas usage data, a predicted call feature of the smart gas call center within a target time period; generates, based on the predicted call feature, the preferred seat feature of the smart gas call center within the target time period; and transmits the preferred seat feature to the smart gas call center terminal 160. For more information about the above process, please refer to FIG. 3 and its related description.

The server 110 may be connected to the terminal device 130 via the network 120, and the server 110 may be connected to the storage device 150 via the network 120. The server 110 may include a processing device, and the processing device may be used to perform the method for the seat management of the smart gas call center as described in some embodiments of the present disclosure.

The network 120 may connect components of the application scenario 100 and/or connect the Internet of Things system to external resource components. The storage device 150 may be used to store data and/or instructions, for example, the storage device 150 may store gas usage data, predicted call features, preferred seat features, or the like. The storage device 150 may be directly connected to the server 110 or be inside the server 110.

The terminal device 130 may refer to one or more terminal devices or software. In some embodiments, the terminal device 130 may receive information related to the seat management of the smart gas call center sent by a processing device and present the information to a user. In some embodiments, the terminal device 130 may be used for the user to input confirmation information related to the method for the seat management of the smart gas call center and send the confirmation information to the server 110.

Exemplarily, the terminal device 130 may include a mobile device 130-1, a tablet computer 130-2, a laptop computer 130-3, etc., or other devices having input and/or output functions, or any combination thereof. The gas device 140 may be used to obtain gas usage data. Exemplarily, the gas device 140 may include a gas stove, a gas flow device, etc.

In some scenarios, the application scenario of the Internet of Things system for the seat management of the smart gas call center may also not include the gas device 140 and obtain the gas usage data directly from a third party platform. The smart gas call center terminal 160 may be used to perform a preferred seat feature. The preferred seat feature may be a finalized seat assignment scheme. The smart gas call center terminal 160 may be a master server of the smart gas call center. Exemplarily, the smart gas call center terminal 160 may assign currently manageable seats based on the preferred seat feature. For more information about the assignment of seats by the smart gas call center terminal 160, please refer to FIG. 3 and its related description.

It should be noted that the application scenario 100 is provided for illustrative purposes only and is not intended to limit the scope of the present disclosure. For those skilled in the art, a variety of modifications or variations may be made in accordance with the description of the present disclosure. For example, the application scenario 100 may also include a database. As another example, the application scenario 100 may be implemented on other devices to achieve similar or different functionality. However, the variations and modifications do not depart from the scope of the present disclosure.

The Internet of Things system is an information processing system that includes a part or all of platforms in a user platform, a service platform, a management platform, a sensing network platform, and an object platform. The user platform is a functional platform that realizes perceptual information acquisition and control information generation for users. The service platform may realize connecting the management platform and the user platform, and plays a function of perceptual information service communication and control information service communication. The management platform may realize the connection and collaboration of the coordination and harmonization between the functional platforms (such as the user platform and the service platform). The management platform aggregates information of an Internet of Things operation system, and may provide perceptual management and control management function for the Internet of Things operation system. The sensing network platform may realize connecting the management platform and the object platform, and plays the function of perceptual information service communication and control information service communication. The object platform is a functional platform for perceptual information generation and control information execution.

The information processing in the Internet of Things system may be divided into a processing flow of user perceptual information and a processing flow of control information. The control information may be information generated based on the user perceptual information. In some embodiments, the control information may include user demand control information and the user perceptual information may include user query information. The processing flow of the perceptual information including obtaining the perceptual information by the object platform, passing the perceptual information to the management platform through the sensing network platform, and then passing the perceptual information to the user platform through the service platform. The user demand control information is generated by the user platform sensing a user input and passed to the management platform via the service platform, and then passed to the object platform via the sensing network platform, thus realizing a control of sending prompt information.

Figure 2:
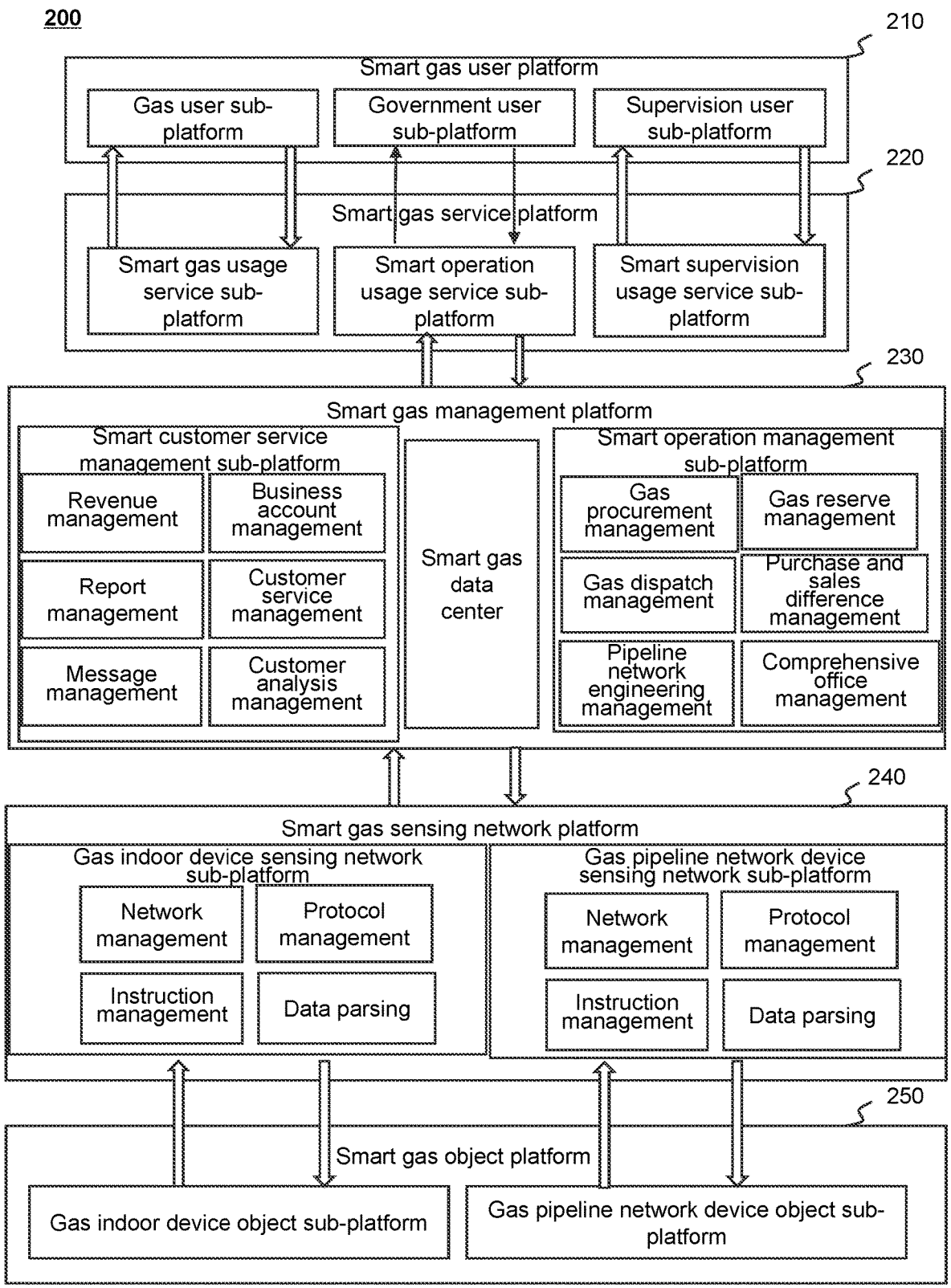
FIG. 2 is a block diagram illustrating an exemplary Internet of Things system for seat management of a smart gas call center according to some embodiments of the present disclosure.

FIG. 2 is a block diagram illustrating an exemplary Internet of Things system for seat management of a smart gas call center according to some embodiments of the present disclosure As shown in FIG. 2, the Internet of Things system 200 for the seat management of the smart gas call center may include a smart gas user platform 210, a smart gas service platform 220, a smart gas management platform 230, a smart gas sensing network platform 240, and a smart gas object platform 250. In some embodiments, the Internet of Things system 200 for the seat management of the smart gas call center may be part of or implemented by a server.

In some embodiments, the Internet of Things system 200 for the seat management of the smart gas call center may be applied to a variety of scenarios for terminal management. In some embodiments, the Internet of Things system 200 for the seat management of the smart gas call center may obtain gas usage data; generate, based on the gas usage data, a predicted call feature of a smart gas call center within a target time period; generate, based on the predicted call feature, a preferred seat feature of the smart gas call center within the target time period; and transmit the preferred seat feature to a terminal of the smart gas call center.

A plurality of scenarios of the Internet of Things system 200 for the seat management of the smart gas call center may include gas user usage scenarios, government user usage scenarios, and supervision user usage scenarios. It should be noted that the above scenarios are only examples and do not limit the specific application scenarios of the Internet of Things system 200 for the seat management of the smart gas call center, and those skilled in the art may apply the Internet of Things system 200 for the seat management of the smart gas call center to any other suitable scenarios based on what is disclosed in this embodiment.

The smart gas user platform 210 may be a user-driven platform that obtains user demands and feeds back information to the user. In some embodiments, the smart gas user platform 210 may interact with the user. In some embodiments, the smart gas user platform 210 may be configured as a terminal device, for example, a smart device such as a cell phone, computer, etc.

In some embodiments, the smart gas user platform 210 may include a gas user sub-platform, a government user sub-platform, and a supervision user sub-platform.

A gas user may receive gas usage data and a preferred seat feature from the smart gas service platform 220 through the gas user sub-platform, or interact with the smart gas service platform 220 to send confirmation information related to the preferred seat feature; a government user may obtain a gas operation service from the smart gas service platform 220 through the government user sub-platform; and a supervision user may send a query instruction or a control instruction of the preferred seat feature to the smart gas service platform 220 through the supervision user sub-platform. The gas user may be a user of a gas device. The government user may be a government manager related to activities such as gas facility protection, gas safety accident prevention and treatment, or gas operation and management. The supervision user may be a manager, a government employee, a gas call customer service, or the like, of the safety monitoring of the gas device and a gas metering system.

In some embodiments, the smart gas user platform 210 may obtain an input instruction from a user to query information related to the gas usage data and the preferred seat feature via a terminal device. In some embodiments, the smart gas user platform 210 may obtain, via the terminal device, confirmation information of the user related to the preferred seat feature.

The smart gas service platform 220 may be a platform that provides information/data delivery and interaction.

In some embodiments, the smart gas service platform 220 may be used for interaction of information and/or data between the smart gas management platform 230 and the smart gas user platform 210. For example, the smart gas service platform 220 may receive a query instruction from the smart gas user platform 210, store and process it, and send it to the smart gas management platform 230. The smart gas service platform 220 may obtain the information related to the gas usage data and the preferred seat feature from the smart gas management platform 230, store and process it, and send it to the smart gas user platform 210. As another example, the smart gas service platform 220 may send the gas usage data and the preferred seat feature to the smart gas user platform 210, obtain the confirmation information related to the preferred seat feature from the user platform 210, store and process it, and then send it to the smart gas management platform 230.

In some embodiments, the smart gas service platform 220 may include a smart gas usage service sub-platform, a smart operation service sub-platform, and a smart supervision service sub-platform. In some embodiments, the smart gas usage service sub-platform may be used to receive the gas usage data and the information related to the preferred seat feature from the smart gas management platform 230 and send the gas usage data and the information to the gas user platform. In some embodiments, the smart operation service sub-platform may be used to receive a query instruction sent by the government user sub-platform and send it to the smart gas management platform 230. In some embodiments, the smart supervision service sub-platform may be used to receive a control instruction sent by the supervision user sub-platform and send it to the smart gas management platform 230.

The smart gas management platform 230 may refer to an Internet of Things platform that coordinates and harmonizes the connection and collaboration between various functional platforms to provide a perceptual management and a control management.

In some embodiments, the smart gas management platform 230 may be used for processing of information and/or data. For example, the smart gas management platform 230 may be used for analyzing the gas usage data and determining the preferred seat feature, etc.

In some embodiments, the smart gas management platform 230 may also be used for interaction of information and/or data between the smart gas service platform 220 and the smart gas sensing network platform 240. For example, the smart gas management platform 230 may receive a query instruction sent by the smart gas service platform 220 (e.g., the smart supervision service sub-platform), store and process it, and send it to the smart gas sensing network platform 240. The smart gas management platform 230 may obtain the information related to the gas usage data from the smart gas sensing network platform 240, store and process it, and send it to the smart gas service platform 220.

In some embodiments, the smart gas management platform 230 may include a smart customer service management sub-platform, a smart operation management sub-platform, and a smart gas data center.

The smart customer service management sub-platform may be used to manage the seat assignment of the smart gas call center. In some embodiments, the smart customer service management sub-platform may be used for revenue management, business account management, report management, customer service management, message management, customer analysis management, etc.

The smart operation management sub-platform may be used to manage a gas distribution and a gas dispatch. In some embodiments, the smart operation management sub-platform may be used for gas procurement management, gas reserve management, gas dispatch management, purchase and sales difference management, pipeline network engineering management, comprehensive office management, etc.

The smart gas data center may be a data management sub-platform that stores, calls, and transfers data. The smart gas data center may store historical data, for example, historical preferred seat features, historical gas usage data, or the like. The above data may be obtained by manual input or historical execution of the present process. In some embodiments, the smart gas data center may be used to send the gas usage data and the preferred seat feature to the smart gas service platform 220.

In some embodiments, the smart gas management platform 230 may be used to obtain gas usage data; generate, based on the gas usage data, a predicted call feature of a smart gas call center within a target time period; generate, based on the predicted call feature, a preferred seat feature of the smart gas call center within the target time period; and transmit the preferred seat feature to a terminal of the smart gas call center.

In some embodiments, the smart gas management platform 230 may be further used to: predict, based on the gas usage data, a gas predicted usage feature within the target time period, wherein the gas predicted usage feature includes gas usage rates at a plurality of time points in the target time period; and generate the predicted call feature of the smart gas call center within the target time period based on the gas predicted usage feature.

In some embodiments, the smart gas management platform 230 may further be used to: generate a gas peak feature based on the gas predicted usage feature; and generate the predicted call feature based on the gas peak feature.

In some embodiments, the smart gas management platform 230 may further be used to: input the gas predicted usage feature of the at least one user type into a call feature prediction model, analyze the gas predicted usage feature of the at least one user type through the call feature prediction model, and output the predicted call feature of the at least one call type within the target time period, wherein the call feature prediction model is a machine learning model.

In some embodiments, the smart gas management platform 230 may further be used to: input the gas predicted usage feature of the at least one user type and the gas business feature of the at least one user type into the call feature prediction model, analyze the gas predicted usage feature of the at least one user type and the gas business feature of the at least one user type through the call feature prediction model, and output the predicted call feature of the at least one call type within the target time period and a call tolerance of the at least one call type.

In some embodiments, the smart gas management platform 230 may further be used to: generate, based on the predicted call feature, at least one group of candidate seat features; and perform at least one round of iterative optimization on the at least one group of candidate seat features, and determine the preferred seat feature from the at least one group of candidate seat features, wherein the iterative optimization includes: calculating an evaluation value of the at least one group of candidate seat features; and performing an elimination screening based on the evaluation value, wherein the evaluation value is related to a gas business feature of at least one user type, and the gas business feature of the at least one user type includes a gas usage frequency and a gas calorific sensitivity In some embodiments, the smart gas management platform 230 may further be used to: calculate a plurality of evaluation values of the at least one group of candidate seat features, each of the evaluation values corresponding to the predicted call feature of the at least one user type.

In some embodiments, the smart gas management platform 230 may further be used to: obtain a final evaluation value by performing a weighted calculation on the plurality of evaluation values, wherein a weight of the weighted calculation is determined based on a predicted gas usage feature of a user corresponding to the seat of the at least one call type.

For more information about the smart gas management platform 230, please refer to FIGS. 3-7 and their related descriptions.

The smart gas sensing network platform 240 may refer to a platform that unifies the management of sensing communications among the platforms in the Internet of Things system 200. In some embodiments, the smart gas sensing network platform 240 may be configured as a communication network and gateway. In some embodiments, the smart gas sensing network platform 240 may include a gas indoor device sensing network sub-platform and a gas pipeline network device sensing network sub-platform. The smart gas sensing network platform 240 may employ a plurality of gateway servers, or a plurality of smart routers, without being overly limited herein. The gas indoor device sensing network sub-platform may be used for network management, protocol management, instruction management, data parsing, etc. The gas network device sensing network sub-platform may be used for the network management, the protocol management, the instruction management, the data parsing, etc.

In some embodiments, the smart gas sensing network platform 240 may be used for a sensing communication of a gas indoor device and a sensing communication of a gas pipeline network device. In some embodiments, the smart gas sensing network platform 240 may be used to send the gas usage data to the smart gas data center. In some embodiments, the smart gas sensing network platform 240 may be used to send the query instruction of the gas usage data to the smart gas object platform 250.

The smart gas object platform 250 may be a functional device that uses gas. In some embodiments, the smart gas object platform 250 may be configured as a smart gas terminal, for examples, a gas usage device, a gas metering device, etc. The smart gas object platform 250 may obtain the gas usage data.

In some embodiments, the smart gas object platform 250 may be configured as a gas device, for example, a gas stove, a gas meter, etc. The smart gas object platform 250 may obtain the gas usage data. In some embodiments, the smart gas object platform 250 may send the gas usage data to the smart gas management platform 230 via the smart gas sensing network platform 240. In some embodiments, the smart gas object platform 250 may include a gas indoor device object sub-platform and a gas pipeline network device object sub-platform. The gas indoor device object sub-platform may be configured for various gas terminals, for example, a gas stove, a gas water heater, a gas meter, etc. The gas network device object sub-platform may be configured for a gas pipeline, etc.

In some embodiments of the present disclosure, with the above Internet of Things system, opposability between different types of data can be ensured, and classified data transmission, traceability, and a classified issuance and processing of instructions can be ensured, thereby making the Internet of Things structure and data processing clear and controllable, and facilitating the control and data processing of the Internet of Things.

Figure 3:
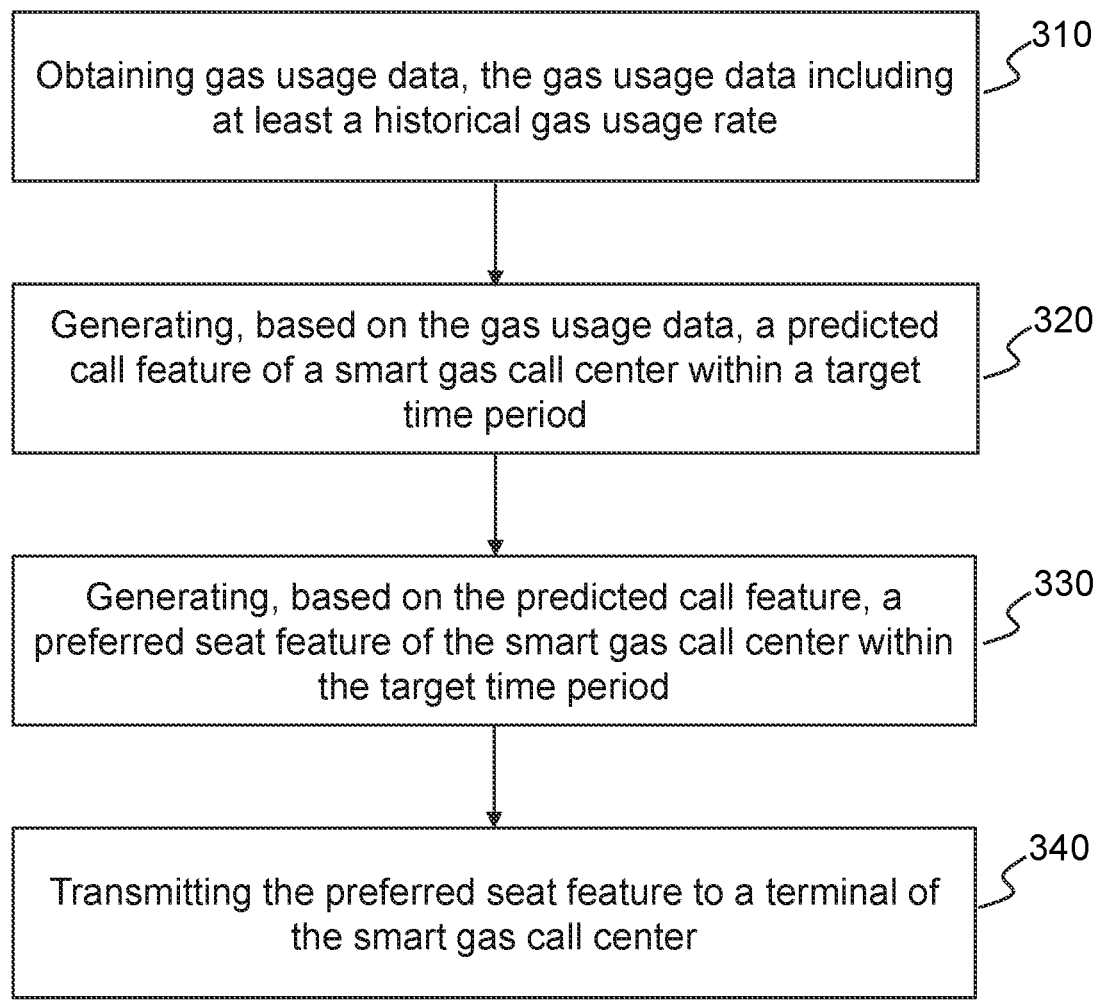
FIG. 3 is a flowchart illustrating an exemplary method for seat management of a smart gas call center according to some embodiments of the present disclosure.

FIG. 3 is a flowchart illustrating an exemplary method for seat management of a smart gas call center according to some embodiments of the present disclosure. In some embodiments, a process 300 may be performed by the smart gas management platform of the Internet of Things system for the seat management of the smart gas call center. As shown in FIG. 3, the process 300 includes the following steps.

Step 310, obtaining gas usage data, the gas usage data including at least a historical gas usage rate.

In some embodiments of the present disclosure, the gas usage data may be metering data of gas utilization and consumption by a gas user. The gas usage data may include a gas consumption volume of the gas user within a time period, a gas usage type, etc.

In some embodiments, the gas usage data includes at least the historical gas usage rate. The historical gas usage rate may be gas usage rates at a plurality of historical time points. For example, the gas usage data may include a gas usage rate of 0.3 m$^3$/h of a gas user on September 10. In some embodiments, the gas usage data may be obtained by a gas device. Exemplarily, the gas device may include a gas stove, a gas metering device, a gas water heater, a floor heater, a heating furnace, a boiler, a welder, etc. In some embodiments, the gas usage data may be obtained through a third party platform. For example, the gas usage data is obtained through the internet.

Step 320, generating, based on the gas usage data, a predicted call feature of a smart gas call center within a target time period.

The smart gas call center may be used to answer a call from a gas user or other users. The smart gas call center may include a plurality of seats for processing and responding to each call.

The target time period may be a certain time period in the future, for example, 3 business days in the future, 2 months in the future, etc. The target time period may be manually set to determine.

The predicted call feature may be a call-in condition of the smart gas call center within the target time period. For example, the predicted call feature may include a total count of calls within the target time period, a count of calls per minute within the target time period, or the like.

In some embodiments, the predicted call feature may be a specific value indicating a count of calls per minute within the target time period. For example, the predicted call feature may be 10, indicating that the count of calls per minute during the target time period is 10. It may be understood that the larger the specific value of the predicted call feature is, the greater the call pressure on the smart gas call center is, and reasonable assignment of seats in the smart gas call center is required to ensure normal processing of each incoming call at this time.

In some embodiments, the predicted call feature may be determined by a mathematical fitting calculation, an artificial intelligence process, or the like. For example, the predicted call feature may be determined by a call feature prediction model. For more information about the determination of the predicted call feature, please refer to FIGS. 4-6, and their related descriptions.

Step 330, generating, based on the predicted call feature, a preferred seat feature of the smart gas call center within the target time period.

The preferred seat feature may be a preferred assignment scheme for seats in the smart gas call center. For example, the preferred seat feature may be 10 seats for complaint calls, 15 seats for repair calls, 5 seats for inquiry calls, etc.

In some embodiments, the preferred seat feature may include a count of customer services for each of one or more time periods within the target time period. For example, the preferred seat feature may also include 30 customer services to handle repair issues, 17 customer services to handle inquiry issues, and 10 customer services to handle complaint issues in the next 3 days. In some embodiments, the preferred seat feature may be determined through an iterative optimization. For further descriptions about the determination of the preferred seat feature, please refer to FIG. 7 and its related description.

Step 340, transmitting the preferred seat feature to a terminal of the smart gas call center.

The terminal of the smart gas call center may be a server of the smart gas call center. In some embodiments, the terminal of the smart gas call center may be used to obtain the preferred seat feature and perform the preferred seat feature. For example, the terminal of the smart gas call center may assign the seats in the smart gas call center based on the preferred seat feature. In some embodiments, the terminal of the smart gas call center may belong to the smart gas management platform. For example, the smart gas management platform may generate the preferred seat feature and transmit it to the smart gas call center to perform a seat assignment scheme.

Through the method for the seat management of the smart gas call center described in some embodiments of the present disclosure, the seats in the smart gas call center may be assigned based on current gas usage data, which can avoid delaying user calls due to unreasonable seat assignment and improve user experience. Furthermore, the seat assignment is predicted based on the historical gas usage data, which can improve the reasonableness of the prediction.

Figure 4:
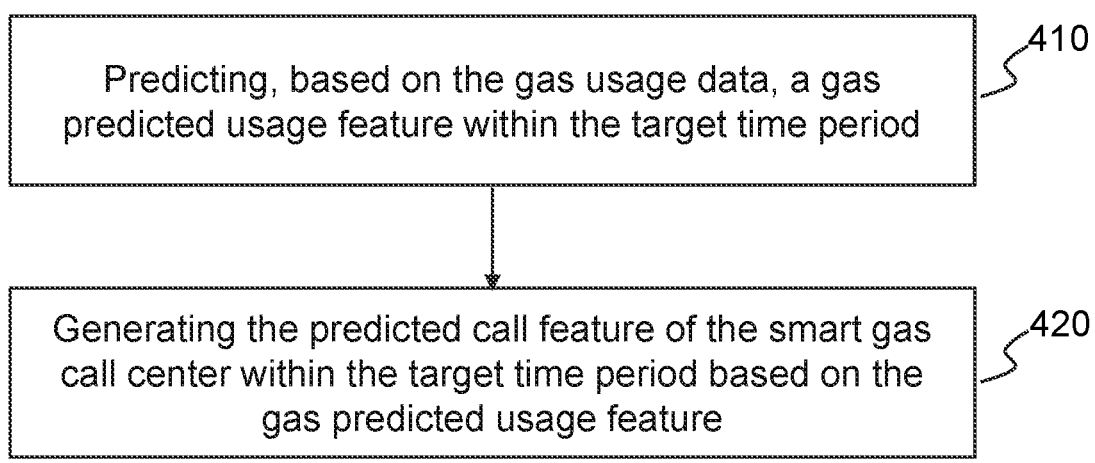
FIG. 4 is a flowchart illustrating an exemplary process for generating a predicted call feature according to some embodiments of the present disclosure.

FIG. 4 is a flowchart illustrating an exemplary process for generating a predicted call feature according to some embodiments of the present disclosure. In some embodiments, a process 400 may be performed by the smart gas management platform of the Internet of Things system for the seat management of the smart gas call center. As shown in FIG. 4, the process 400 includes the following steps.

Step 410, predicting, based on the gas usage data, a predicted gas usage feature within the target time period.

The predicted gas usage feature may be a gas usage condition of a user within the target time period. For example, the predicted gas usage feature may include a gas usage volume of the gas user within the target time period. In some embodiments, the predicted gas usage feature may include the gas usage rates at the plurality of time points within the target time period. For example, the predicted gas usage feature may include a gas usage rate of 0.45 m$^3$/h of the gas user at 9:00, a gas usage rate of 0.3 m$^3$/h of the gas user at 10:00, etc. In some embodiments, the predicted gas usage feature may also include a gas usage volume within the target time period. For example, if the gas user has a gas usage volume of 0.3 m$^3$ at 9:00-10:00, the predicted gas usage feature may also include a gas usage rate of 0.3 m$^3$/h of the gas user at 9:00-10:00.

In some embodiments, the predicted gas usage feature may be determined by a vector matching calculation, a mathematical fitting calculation, artificial intelligence, etc.

In some embodiments, the predicted gas usage feature may be determined by a temporal model. An exemplary temporal model may be a long short term memory (LSTM) model. An input of the temporal model may include the gas usage data. An output of the temporal model may include the predicted gas usage feature within the target time period.

In some embodiments, the temporal model may be obtained through training based on a large count of training samples with labels. Specifically, a plurality of groups of training samples with labels are input to an initial temporal model, a loss function is constructed based on the output of the initial temporal model and the labels, and parameters of the temporal model are updated by training based on iterations of the loss function. In some embodiments, the temporal model may be trained using various manners based on the training samples. For example, the temporal model may be trained using a gradient descent manner. When a preset condition is met, the training ends and a trained temporal model is obtained. The preset condition may be a loss function convergence.

In some embodiments, the training samples may include historical gas usage data at a plurality of historical time points. The labels may be gas usage features corresponding to the historical gas usage data at the plurality of historical time points. The training samples may be determined by calling information stored by a storage device. The labels may be determined by manual annotation.

In some embodiments, a process of determining the predicted gas usage feature by the temporal model may be performed successively. For example, the gas usage data is input into the temporal model and the predicted gas usage feature at a first time point within the target time period is output; then the gas usage data and the predicted gas usage feature at the first time point within the target time period are input into the temporal model and the predicted gas usage feature at a second time point within the target time period is output . . . . The above process is stopped until the predicted gas usage features at the plurality of time points within the target time period are determined. The first time point and the second time point are time points in the target time period, and the second time point may be later than the first time point.

The temporal model may sequentially obtain the predicted gas usage features at the plurality of time points, and each predicted gas usage feature is determined based on a previous predicted gas usage feature, which ensures the consistency of the data.

Step 420, generating the predicted call feature of the smart gas call center within the target time period based on the predicted gas usage feature.

In some embodiments, the predicted call feature of the smart gas call center within the target time period may be determined by further processing of the predicted gas usage feature. For example, the predicted call feature is determined based on a gas peak feature, the predicted call feature is determined based on a call feature prediction model, etc. For more information about determining the predicted call feature based on the gas peak feature, please refer to FIG. 5 and its related description. For more information about determining the predicted call feature based on the call feature prediction model, please refer to FIG. 6 and its related description.

In some embodiments, the input of the temporal model may also include a gas business feature. The gas business feature refers to a gas usage habit of a gas user and a parameter feature of a gas device.

In some embodiments, the gas business feature may include a gas usage frequency and a gas calorific sensitivity. The gas usage frequency may be a gas usage frequency of the gas user, and the gas usage frequency may be expressed as a numerical value, with a larger value indicating that the gas user uses gas more frequently. For example, the gas usage frequency may be inversely proportional to a gas usage period of the gas user, and a gas usage frequency of 2 means that the gas user uses gas 2 times per day.

The gas calorific sensitivity may be a temperature sensitivity of the gas device. For example, a gas stove and an industrial gas furnace with a large temperature variation interval may have a low gas calorific sensitivity, such as a value of 1. A gas water heater and a floor heating with a small temperature variation interval may have a high gas calorific sensitivity, such as a value of 9.

In some embodiments, the gas business feature may be determined based on user input. The introduction of the gas business feature into the temporal model can improve the correlation between the temporal model and an actual gas usage situation and improve the realism of the output of the temporal model.

In this embodiment, when the historical gas usage data is processed, the features of the historical gas usage data are extracted for predicting future predicted gas usage features, so that the prediction results are correlated with the historical data; furthermore, the temporal model is used in the prediction process, which can reduce the subjectivity of manual prediction and improve the prediction efficiency.

Figure 5:
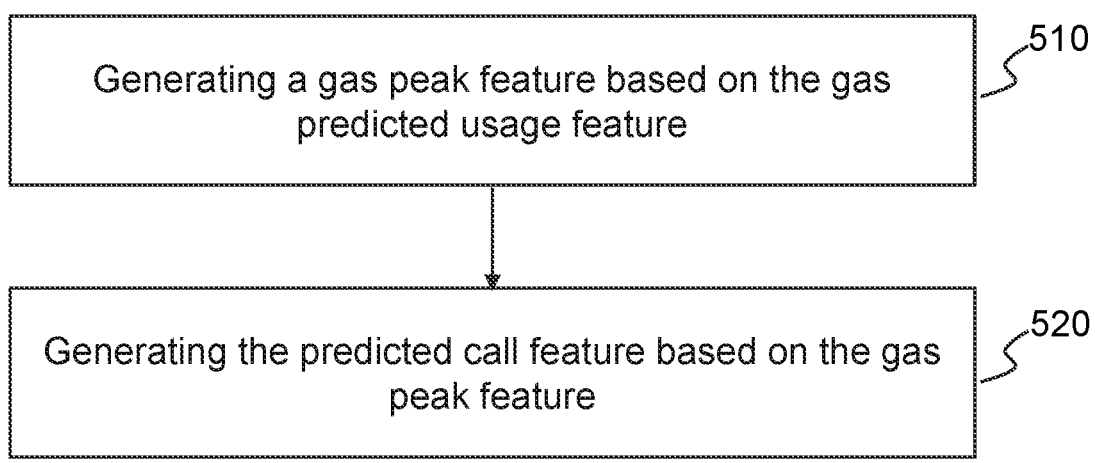
FIG. 5 is a flowchart illustrating an exemplary process for generating a predicted call feature according to some other embodiments of the present disclosure.

FIG. 5 is a flowchart illustrating an exemplary process for generating a predicted call feature according to some other embodiments of the present disclosure. In some embodiments, a process 500 may be performed by the smart gas management platform of the Internet of Things system for seat management of a smart gas call center. As shown in FIG. 5, the process 500 includes the following steps.

Step 510, generating a gas peak feature based on the predicted gas usage feature.

The gas peak feature may be a peak gas usage time period and a corresponding gas usage rate of that time period.

In some embodiments, the gas peak feature may be a vector consisting of the peak gas usage time period and the corresponding gas usage rate of that time period. For example, a gas peak feature of a target time period of 9:00-11:00 may be:

$$\vec{M}=(9:30,10,V_1,V_2\ldots V_{10})$$

wherein the above gas peak feature indicates that there is only one gas usage peak in 9:00-11:00, and each minute in the 10 minutes after 9:30 corresponds to a gas usage rate $V_n$.

In some embodiments, the smart gas management platform may use a time period consisting of time points where the gas usage rate is greater than or equal to a gas usage rate threshold in the predicted gas usage feature as the peak time period, and the gas usage rate corresponding to the peak time period as the gas peak feature. For example, in the target time period of 9:00-11:00, the gas usage rate obtained every 1 minute includes: 0, 0.1 m$^3$/h, 0.3 m$^3$/h, 0.5 m$^3$/h, 0.6 m$^3$/h, 0.62 m$^3$/h, 0.45 m$^3$/h, 0.41 m$^3$/h, etc., and the gas usage rate threshold is set as 0.5 m$^3$/h, then the gas usage rates of 0.5 m$^3$/h, 0.6 m$^3$/h and 0.62 m$^3$/h and time points corresponding to the gas usage rates are used as the gas peak features. The gas usage rate threshold may be set manually.

In some embodiments, when a time interval between two gas peak features is less than a time threshold, the two gas peak features may be combined into a single gas peak feature. For example, in the target time period 9:00 to 11:00, the gas usage rate obtained every 1 minute includes: 0, 0.1 m³/h, 0.6 m³/h, 0.5 m³/h, 0.2 m³/h, 0.6 m³/h, 0.55 m³/h, 0.41 m³/h, etc., and the gas usage rate threshold is set as 0.5 m³/h and the time threshold is set as 5 minutes, then the gas usage rates of first 0.6 m³/h and 0.5 m³/h and the time points corresponding to the gas usage rates are used as the first gas peak features, and the gas usage rates of second 0.6 m³/h and 0.55 m³/h and the time points corresponding to the gas usage rates are used as the second gas peak features, and since the time period between the above two gas peak features is less than a time threshold of 5 minutes, the above two gas peak features may be combined into one gas peak feature, and the combined gas peak feature may be expressed as:

$$\vec{M}=(9:02, 5, 0.6, 0.5, 0.2, 0.6, 0.55)$$

Step 520, generating the predicted call feature based on the gas peak feature.

In some embodiments, the predicted call feature may include a predicted call peak feature.

The predicted call peak feature may be a peak time period of calls to the smart gas call center and a count of calls per unit time corresponding to the peak time period.

In some embodiments, the predicted call peak feature is the vector consisting of the peak time period and the count of calls per unit time corresponding to the peak time period. For example, the predicted call peak feature of a target time period of 9:00-11:00 may be:

$$\vec{N}=(9:30, 10, n_1, n_2 \ldots n_{10})$$

wherein the above-predicted call peak feature represents a count of calls $n_n$ in each minute during the 10 minutes after 9:30.

In some embodiments, the smart gas management platform may generate the predicted call peak feature based on the gas peak feature and based on a preset relationship between the gas peak feature and the predicted call peak feature. The preset relationship may be determined by looking up a table.

In some embodiments, the smart gas management platform may also input the gas peak features into a call feature prediction model, and the call feature prediction model outputs a corresponding predicted call peak feature. For more information about the call feature prediction model, please refer to FIG. 6 and its related description.

In some embodiments, the smart gas management platform may use the obtained predicted call peak feature as the predicted call feature.

In the embodiment of the present disclosure, only the predicted gas usage feature of the peak time period of gas usage is processed, and the predicted call feature corresponding to the peak time period is determined, that is, only the data of the peak time period is processed, which can avoid the processing of meaningless data (data of the low peak time period) and improve the efficiency of data usage.

Figure 6:
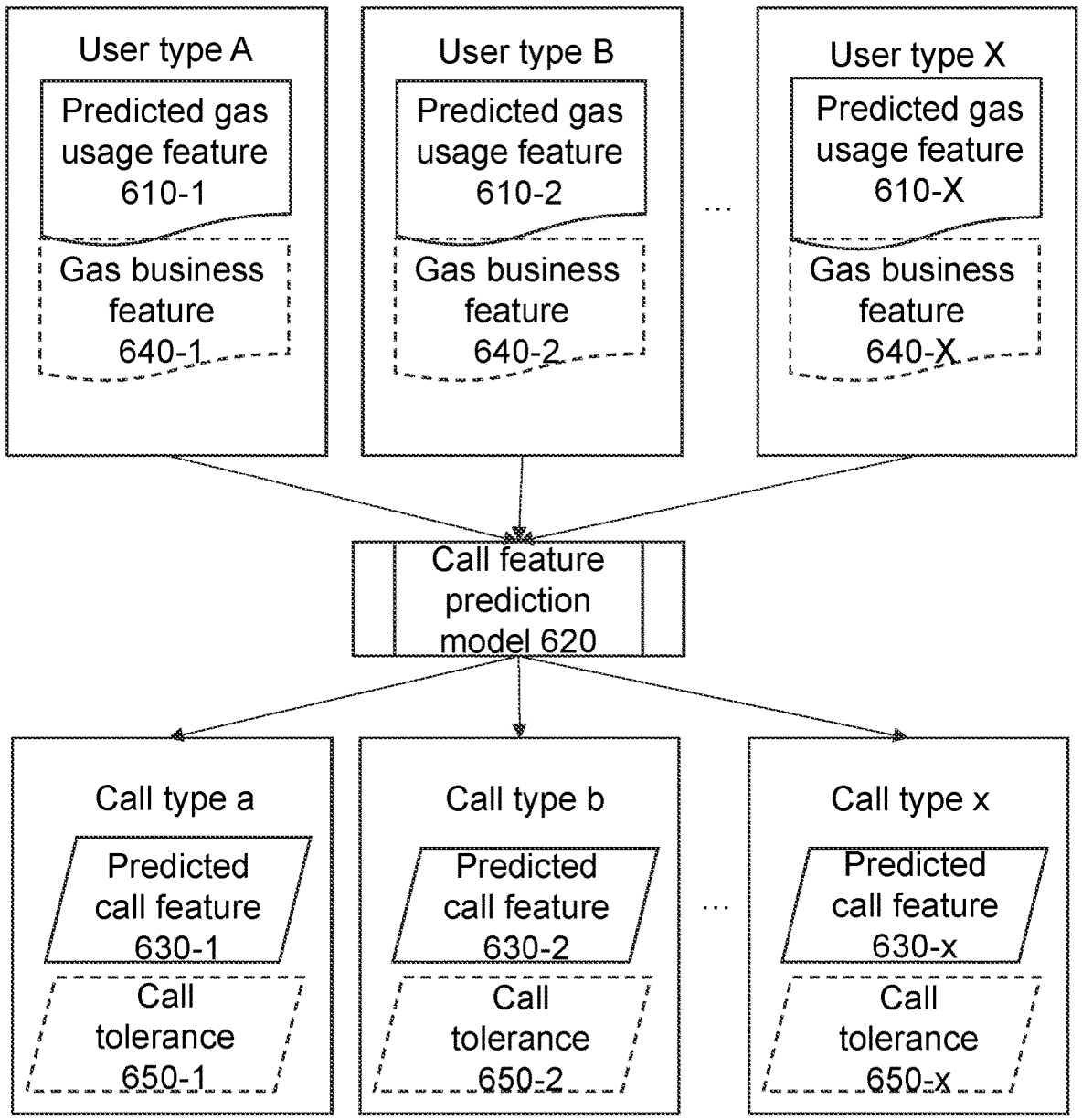
FIG. 6 is a structural diagram illustrating an exemplary call feature prediction model according to some embodiments of the present disclosure.

FIG. 6 is a structural diagram illustrating an exemplary call feature prediction model according to some embodiments of the present disclosure.

In some embodiments, the smart gas management platform may input a predicted gas usage feature of at least one user type into the call feature prediction model, analyze the predicted gas usage feature of the at least one user type by the call feature prediction model, and obtain a predicted call feature of at least one call type within the target time period output by the call feature prediction model. The call feature prediction model is a machine learning model, for example, a neural network model.

As shown in FIG. 6, an input of the call feature prediction model 620 may include a predicted gas usage feature 610 (e.g., a predicted gas usage feature 610-1, a predicted gas usage feature 610-2 . . . a predicted gas usage feature 610-X, etc.). An output of the call feature prediction model 620 may include a predicted call feature 630 (e.g., a predicted call feature 630-1, a predicted call feature 630-2 . . . a predicted call feature 630-X, etc.).

In some embodiments, the gas usage data includes gas usage data of the at least one user type. The user type may be a type of a gas terminal that uses gas. For example, user type A may be a gas stove, user type B may be an industrial gas stove, etc.

In some embodiments, the predicted gas usage feature includes a predicted gas usage feature of the at least one user type. For example, the predicted gas usage feature 610-1 may be a predicted gas usage feature corresponding to a gas stove user; the predicted gas usage feature 610-2 may be a predicted gas usage feature corresponding to an industrial gas stove user, etc.

In some embodiments, the predicted call feature includes the predicted call feature of the at least one call type. The call type may be a demand type of a gas user calling in. For example, a call type a may be a complaint, and a call type b may be a repair report, etc. The call type a corresponds to the predicted call feature 630-1, the call type b corresponds to the predicted call feature 630-2 . . . a call type x corresponds to the predicted call feature 630-x, etc. The above user type and call type may be determined by presetting.

In some embodiments, the call feature prediction model 620 may be obtained through training based on a large count of training samples with labels. Specifically, a plurality of groups of training samples with labels are input to an initial call feature prediction model, a loss function is constructed based on an output of the initial call feature prediction model and the labels, and parameters of the call feature prediction model are iteratively updated based on the loss function.

In some embodiments, the call feature prediction model may be trained using various manners based on training samples. For example, the call feature prediction model may be trained using a gradient descent manner. When a preset condition is met, the training ends and a trained call feature prediction model is obtained. The preset condition may be a loss function convergence.

In some embodiments, the training samples may include historical predicted gas usage features of a plurality of user types. For example, the training samples may include historical predicted gas usage features of gas stove users and industrial gas furnace users. The labels may be predicted call features of a plurality of call types corresponding to the historical predicted gas usage features. For example, the labels may include predicted usage features of inquiry calls of the gas stove users. The training samples may be determined by calling information stored by the storage device. The labels may be obtained by manual annotation. In some embodiments, the training samples may also include historical gas business features of historical users corresponding to the historical predicted gas usage features.

In some embodiments, the smart gas management platform may further be used to: input the predicted gas usage feature of the at least one user type and the gas business feature of the at least one user type into the call feature prediction model, analyze the predicted gas usage feature of the at least one user type and the gas business feature of the at least one user type through the call feature prediction model, and output the predicted call feature of the at least one call type within the target time period and a call tolerance of the at least one call type.

As shown in FIG. 6, the input of the call feature prediction model 620 may also include a gas business feature 640 (a gas business feature 640-1, a gas business feature 640-2 . . . a gas business feature 640-X, etc.). The gas business feature 640-1 corresponds to the user type A, the gas business feature 640-2 corresponds to the user type B . . . the gas business feature 640-X corresponds to the user type X, etc.

The output of the call feature prediction model 620 may also include a call tolerance 650 (a call tolerance 650-1, a call tolerance 650-2 . . . a call tolerance 650-x, etc.). The call tolerance 650-1 corresponds to the call type a, the call tolerance 650-2 corresponds to the call type b . . . the call tolerance 650-x corresponds to the call type x, etc. Correspondingly, the training samples of the call feature prediction model 620 may also include historical gas business features of the plurality of user types, and the training labels may also include call tolerances corresponding to the plurality of call types. The above training samples and training labels may be determined by calling historical data stored in the storage device.

The call tolerance represents a tolerance of a gas user to wait for an answer. In some embodiments, the call tolerance may be expressed by a specific numerical value, for example, 60, 90, etc. It may be understood that a larger call tolerance indicates a longer call waiting time that may be tolerated by a gas user when a certain call type is performed. By introducing the gas business feature in the call feature prediction model, the actual gas usage can be better approximated. The model training process uses historical data as samples and labels, which can improve the correlation between the model output and historical data. In addition, by presetting the user type and call type, the uniformity of the model input and output dimensions is ensured to avoid mutual interference of different types of data.

In the embodiment of the present disclosure, the judgment of the predicted call feature is realized through an artificial intelligence model to avoid the subjective influence brought by human judgment; in addition, gas usage habits of gas users and parameter features of gas devices are introduced in the input of the artificial intelligence model to make the model closer to the actual gas usage and improve the prediction accuracy.

Figure 7:
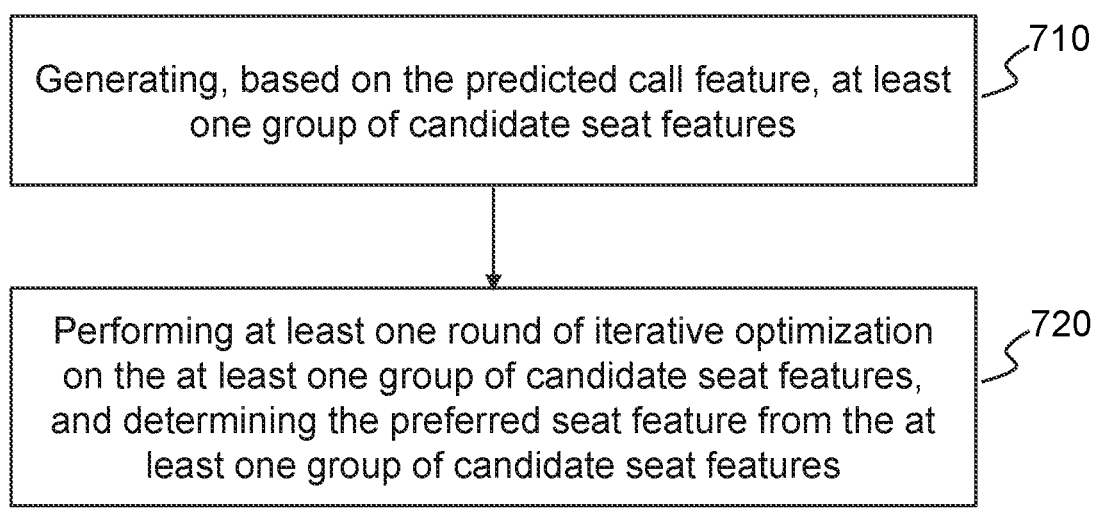
FIG. 7 is a flowchart illustrating an exemplary process for determining a preferred seat feature according to some embodiments of the present disclosure.

FIG. 7 is a flowchart illustrating an exemplary process for determining a preferred seat feature according to some embodiments of the present disclosure. In some embodiments, a process 700 may be performed by the smart gas management platform of the Internet of Things system for seat management of a smart gas call center. As shown in FIG. 7, the process 700 includes the following steps.

Step 710, generating, based on the predicted call feature, at least one group of candidate seat features.

The candidate seat features may be a candidate seat assignment situation in the smart gas call center within the target time period. For example, the candidate seat features may be 5 seats for complaint calls, 10 seats for repair calls, 5 seats for inquiry calls, etc. In some embodiments, the candidate seat features may be randomly generated by the processing device of the smart gas management platform. For example, with a known total count of seats in the smart gas call center, the at least one group of candidate seat features are generated by determining a count of seats assigned to each call type within the target time period using a manner of permutations, random numbers, etc.

Step 720, performing at least one round of iterative optimization on the at least one group of candidate seat features, and determining the preferred seat feature from the at least one group of candidate seat features.

In some embodiments, the iterative optimization may include: calculating an evaluation value of the at least one group of candidate seat features; and performing an elimination screening on the evaluation value, wherein the evaluation value is related to a gas business feature of at least one user type, and the gas business feature of the at least one user type includes a gas usage frequency and a gas calorific sensitivity. The performing an elimination screening on the evaluation value may include selecting a candidate seat feature with the largest evaluation value as the preferred seat feature.

The evaluation value may be a scored value of a group of candidate seat features. For example, the evaluation value may be a specific value such as 90, 85, etc. It may be understood that the larger the value of the evaluation value is, the better the match between a candidate seat feature corresponding to the evaluation value and the predicted gas usage feature is. In some embodiments, the evaluation value may be determined by manual selection. In some embodiments, the evaluation value may be determined by an evaluation value algorithm. The evaluation value algorithm may include following steps.

S1, generating an input stream of each call in the predicted call feature through a probability function based on the predicted call feature. The input stream may be a simulated call that simulates the each call in the predicted call feature. The probability function may be a function capable of realizing the predicted call feature. For example, the probability function may be any function capable of generating random numbers. When the predicted call feature is 10 (i.e., 10 calls per minute), the probability function may be used to randomly generate 10 calls per minute with random start times or random end times within the target time period to form 10 input streams. For example, the probability function randomly generates one call with a start time of 9:00:05, one call with a start time of 9:00:08, etc., and repeats 10 times to form 10 input streams.

In some embodiments, each input stream may include a service time, and the service time may be an average service time of each seat for each gas user. In some embodiments, the service time may be an average of a plurality of historical service times corresponding to a particular call type. For example, the service time of the repair call type may be an average of the service times of 10 historical repair calls.

In some embodiments, each input stream may include a corresponding user type and a call type. For example, a user type of a particular input stream may be a gas stove user, and a call type of that input stream may be an inquiry call.

In some embodiments, the service time of the input stream is also related to the corresponding user type and call type. When the user type/call type of the input stream is different, the corresponding service times may be set differently to simulate call processes for different user types/call types.

For example, the service time may be extended when the user type of the input stream is an industrial gas furnace user. The service time may be extended when the call type of the input stream is an inquiry call. A service time extension is determined based on a historical average service time of the related user type/call type. By determining the service time of the input stream according to the user type/call type, the service time may be adjusted according to a real call performance of the user, and the realism of simulating the call process of the input stream is improved.

In some embodiments, the smart gas management platform may generate different input streams at different times via a first probability function and a second probability function. In some embodiments, the smart gas management platform may generate input streams of time periods other than a call peak via the first probability function. In some embodiments, the smart gas management platform may generate input streams of time periods corresponding to the call peak via the second probability function. The call peak may be a time period corresponding to the gas peak feature described above. The first probability function and the second probability function may be different. By using different probability functions to distinguish peak and non-peak input streams, it is possible to obtain an input stream with better simulated call effect and improve the accuracy of the determination of the evaluation value.

S2, performing a simulated call by using the input stream and count parameter features within the target time period. The parameter features may include an average seat utilization rate, a ratio of busy time periods, a total call waiting time, etc. When the above simulated call arrives at a terminal of the smart gas call center, the smart gas call center randomly assigns a seat corresponding to a user type/call type based on the user type/call type corresponding to the call, and performs a service. The parameter features within the target time period may be counted during the service process.

The average seat utilization rate may be an average of a ratio of a count of seat utilization to a total count of seats at various time points within the target time period. The count of seat utilization may be a count of customer services working at the same time at each time point within the target time period. The ratio of busy time periods may be a ratio of a duration of all seats used to a duration of the target time period. The duration of all seats used may be a duration when all customer services are working at the same time. The total call waiting time may be a sum of waiting times of all gas users. The sum of waiting times of all gas users may be a sum of times that all gas users need to wait before the customer services perform services.

In some embodiments, the evaluation value may be determined based on the parameter features described above. For example, the evaluation value may be determined by looking up a parameter feature-evaluation value table, or by performing a weighted calculation based on the parameter features. Exemplarily, the evaluation value may be calculated by a following equation (1):

$$T = n_1 a_1 + n_2 a_2 - n_3 a_3 \quad (1)$$

wherein T denotes an evaluation value, $a_1$ denotes an average seat utilization rate, $a_2$ denotes a ratio of busy time periods, $a_3$ denotes a total call waiting time, $n_1$ denotes a weight corresponding to the average seat utilization rate, $n_2$ denotes a weight corresponding to the ratio of busy time periods, and $n_3$ denotes a weight corresponding to the total call waiting time. It may be understood that the larger the average seat utilization rate is, the larger the evaluation value is. The larger the ratio of busy time periods is, the larger the evaluation value is. The smaller the total call waiting time is, the larger the evaluation value is.

S3, obtaining a plurality of evaluation values by cyclically executing S1 and S2, and taking an average of the plurality of evaluation values as a final evaluation value of the at least one group of candidate seat features. In some embodiments, a count of cycles of cyclically executing S1 and S2 may be determined based on a preset count of times. For example, the preset count of times may be 10,000 times. It may be understood that the evaluation value of each candidate seat feature may be determined using the evaluation value algorithm described above.

In some embodiments, a waiting time of a gas user may be related to a call tolerance output by the call feature prediction model. For example, the greater the call tolerance is, the longer the waiting time is. By correlating the call tolerance with the waiting time, a reasonable waiting time can be assigned to each gas user based on a waiting tolerance of the individual gas user, thereby making the assignment of seats more reasonable.

In some embodiments, the predicted call feature may include the predicted call feature of the at least one user type. For example, the predicted call feature may be the call feature of the industrial gas furnace user. In some embodiments, the candidate seat feature may include the seat feature of the at least one call type. For example, the candidate seat feature may be the seat feature of the inquiry call.

In some embodiments, the smart gas management platform may calculate a plurality of evaluation values of the at least one group of candidate seat features, each of the evaluation values corresponds to the predicted call feature of the at least one user type. For example, the smart gas management platform may individually calculate an evaluation value of a candidate seat feature corresponding to a gas user who uses a gas stove using the evaluation value algorithm described above, and select the candidate seat feature with the largest evaluation value as the preferred seat feature.

By classifying the predicted call features according to the user types of gas users, the usage of each user type can be calculated separately, and the evaluation value can be calculated by controlling variables, so as to avoid mutual interference of data of different user types.

In some embodiments, the smart gas management platform may obtain the final evaluation value by performing the weighted calculation on the plurality of evaluation values of the at least one group of candidate seat features. The weight of the weighted calculation above is determined based on a predicted gas usage feature of a user corresponding to a seat of the at least one call type.

It may be understood that the larger the specific value of the predicted gas usage feature is (i.e., the larger the gas usage rates at the plurality of time points within the target time period are), the larger the weight of the evaluation value corresponding to the candidate seat feature is. Exemplarily, the weight of the weighted calculation may be a specific value of the predicted gas usage feature. For example, if the gas usage rate in the predicted gas usage feature is 0.45 $m^3/h$, the weight of this evaluation value in the weighted calculation may be 0.45.

In some embodiments, the at least one call type seat further includes a smart Artificial Intelligence (AI) seat. The smart AI seat may be used to share a manual seat. When the smart gas call center receives a gas user call, the smart gas management platform may assign the call to the manual seat first. When the manual seat is occupied or busy, the smart gas management platform may assign the call to the smart AI seat.

In some embodiments, a count of smart AI seats may be determined based on the predicted call features. For example, the more the predicted call features of a preset type (e.g., complaint type) in the predicted call features is, the larger the count of the smart AI seats may be. The smart AI seat may share the work pressure of the manual seat, and the smart AI seat can handle some simple problems in complaint calls and reduce the pressure of seat assignment in the smart gas call center.

In some embodiments of the present disclosure, by iteratively screening out the preferred seat feature from the candidate seat features, a seat assignment scheme that better matches the gas usage can be obtained to achieve a reasonable planning of seats.

The present disclosure provides a non-transitory computer-readable storage medium storing computer instructions, wherein when reading the computer instructions in the storage medium, a computer executes the method for the seat management of the smart gas call center.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for seat management of a smart gas call center, wherein the method is performed by a processor of a smart gas management platform in an Internet of Things system for seat management of a smart gas call center, and the method comprises:

obtaining gas usage data, the gas usage data including at least a historical gas usage rate;

generating, based on the gas usage data, a predicted call feature of a smart gas call center within a target time period;

generating, based on the predicted call feature, a preferred seat feature of the smart gas call center within the target time period, the preferred seat feature including a count of customer services in each of one or more time periods within the target time period; and transmitting the preferred seat feature to a terminal of the smart gas call center, wherein the generating, based on the gas usage data, a predicted call feature of a smart gas call center within a target time period includes:

predicting, based on the gas usage data, a predicted gas usage feature within the target time period, wherein the predicted gas usage feature includes gas usage rates at a plurality of time points in the target time period; and generating the predicted call feature of the smart gas call center within the target time period based on the gas predicted usage feature, the predicted call feature within the target time period being further related to a gas business feature;

the gas usage data includes gas usage data of at least one user type, the predicted gas usage feature includes a predicted gas usage feature of the at least one user type, and the predicted call feature includes a predicted call feature of at least one call type;

the generating the predicted call feature of the smart gas call center within the target time period based on the predicted gas usage feature includes:

inputting the predicted gas usage feature of the at least one user type into a call feature prediction model, analyzing the predicted gas usage feature of the at least one user type through the call feature prediction model, and outputting the predicted call feature of the at least one call type within the target time period, wherein the call feature prediction model is a machine learning model;

the inputting the predicted gas usage feature of the at least one user type into a call feature prediction model, analyzing the predicted gas usage feature of the at least one user type through the call feature prediction model, and outputting the predicted call feature of the at least one call type within the target time period includes:

inputting the predicted gas usage feature of the at least one user type and a gas business feature of the at least one user type into the call feature prediction model, analyzing the predicted gas usage feature of the at least one user type and the gas business feature of the at least one user type through the call feature prediction model, and outputting the predicted call feature of the at least one call type within the target time period and a call tolerance of the at least one call type; and the generating, based on the predicted call feature, a preferred seat feature of the smart gas call center within the target time period includes:

generating, based on the predicted call feature, at least one group of candidate seat features; and performing at least one round of iterative optimization on the at least one group of candidate seat features, and determining the preferred seat feature from the at least one group of candidate seat features, wherein the iterative optimization includes: calculating an evaluation value of the at least one group of candidate seat features; and performing an elimination screening on the evaluation value, wherein the evaluation value is related to a gas business feature of at least one user type, and the gas business feature of the at least one user type includes a gas usage frequency and a gas calorific sensitivity.

2. The method of claim 1, wherein the predicted call feature includes a predicted call peak feature, and the generating the predicted call feature of the smart gas call center within the target time period based on the predicted gas usage feature includes:

generating a gas peak feature based on the predicted gas usage feature; and generating the predicted call feature based on the gas peak feature.

3. A non-transitory computer-readable storage medium, storing computer instructions, wherein when reading the computer instructions in the storage medium, a computer executes the method as claimed in claim 1.

4. An Internet of Things system for seat management of a smart gas call center, wherein the Internet of Things system comprises a smart gas user platform, a smart gas service platform, a smart gas management platform, a smart gas sensing network platform, and a smart gas object platform, and the smart gas management platform is used to:

obtain gas usage data, the gas usage data including at least a historical gas usage rate;

generate, based on the gas usage data, a predicted call feature of a smart gas call center within a target time period;

generate, based on the predicted call feature, a preferred seat feature of the smart gas call center within the target time period, the preferred seat feature including a count of customer services in each of one or more time periods within the target time period; and transmit the preferred seat feature to a terminal of the smart gas call center;

the smart gas management platform is further used to:

predict, based on the gas usage data, a predicted gas usage feature within the target time period, wherein the predicted gas usage feature includes gas usage rates at a plurality of time points in the target time period; and generate the predicted call feature of the smart gas call center within the target time period based on the predicted gas usage feature;

the gas usage data includes gas usage data of at least one user type, the predicted gas usage feature includes a predicted gas usage feature of the at least one user type, and the predicted call feature includes a predicted call feature of at least one call type;

the smart gas management platform is also further used to:

input the predicted gas usage feature of the at least one user type into a call feature prediction model, analyze the predicted gas usage feature of the at least one user type through the call feature prediction model, and output the predicted call feature of the at least one call type within the target time period, wherein the call feature prediction model is a machine learning model;

input the predicted gas usage feature of the at least one user type and a gas business feature of the at least one user type into the call feature prediction model, analyze the predicted gas usage feature of the at least one user type and the gas business feature of the at least one user type through the call feature prediction model, and output the predicted call feature of the at least one call type within the target time period and a call tolerance of the at least one call type, generate, based on the predicted call feature, at least one group of candidate seat features; and perform at least one round of iterative optimization on the at least one group of the candidate seat features, and determine the preferred seat feature from the at least one group of candidate seat features, wherein the iterative optimization includes: calculating an evaluation value of the at least one group of candidate seat features; and performing an elimination screening on the evaluation value, wherein the evaluation value is related to a gas business feature of at least one user type, and the gas business feature of the at least one user type includes a gas usage frequency and a gas calorific sensitivity.

\* \* \* \* \*